United States Patent [19]

Yoshida

[11] Patent Number: 4,942,672
[45] Date of Patent: Jul. 24, 1990

[54] METHOD OF MEASURING THE HEIGHT OF BURRS AND A BURR MEASURING HEAD

[75] Inventor: Kunio Yoshida, Gotenba, Japan

[73] Assignee: Yazaki Corporation, Tokyo, Japan

[21] Appl. No.: 387,747

[22] Filed: Aug. 1, 1989

[30] Foreign Application Priority Data

Aug. 12, 1988 [JP] Japan .................. 63-200034

[51] Int. Cl.⁵ .................................................. G01B 5/18
[52] U.S. Cl. .................................... 33/832; 33/833; 33/836
[58] Field of Search .............. 33/836, 832, 833, 838, 33/556, 572, 792, 794, 199 R, 829; 439/912

[56] References Cited

U.S. PATENT DOCUMENTS

| 1,921,899 | 8/1933 | Webbeking | 33/829 |
| 2,114,936 | 4/1938 | Pilnick | 33/829 |
| 3,111,766 | 11/1963 | Bryant | 33/829 |
| 3,195,237 | 7/1965 | Aldeborgh | 33/836 |
| 4,524,524 | 6/1985 | Frank et al. | 33/199 R |

FOREIGN PATENT DOCUMENTS 0050328 9/1969 German Democratic Rep. ... 33/836

Primary Examiner—William A. Cuchlinski, Jr.
Assistant Examiner—William C. Dowling
Attorney, Agent, or Firm—Armstrong, Nikaido, Marmelstein, Kubovcik & Murray

[57] ABSTRACT

A simple method of measuring the height of burrs such as formed in the crimped clamping portion of a crimp-style terminal, without cutting the terminal off from a cable fastened thereto, and a simple, inexpensive burr height measuring head to be used in combination with a displacement measuring device available in the market. The burr height measuring head comprises a grip, a measuring bit having a knife-edged tip and formed integrally with the grip so as to project from one end of the grip, and holding means rotatably joined to the other end of the grip and fixedly joined to the movable measuring member of a displacement measuring device. In measuring the height of a burr, the burr height measuring head is positioned with the knife-edged tip of the measuring bit in parallel contact with the bottom side of the burr, the scale of the displacement measuring device is adjusted so that the zero scale mark thereof coincides with the pointer of the displacement measuring device, the burr height measuring head is turned so that the knife-edged tip of the measuring bit extends substantially perpendicularly to the edge of the burr, the burr height measuring head is positioned so that the knife-edge tip of the measuring bit is in contact with the edge of the burr. The displacement of the burr height measuring head corresponding to the height of the burr is indicated on the scale of the displacement measuring device.

7 Claims, 3 Drawing Sheets

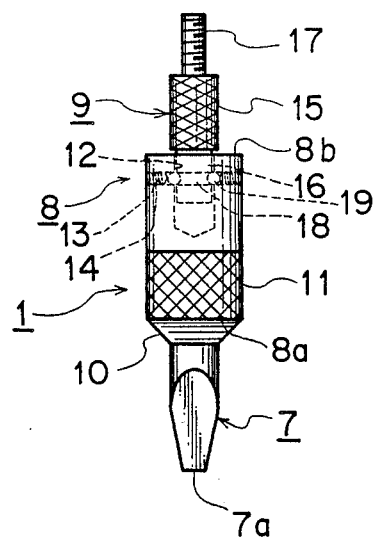
FIG. 1
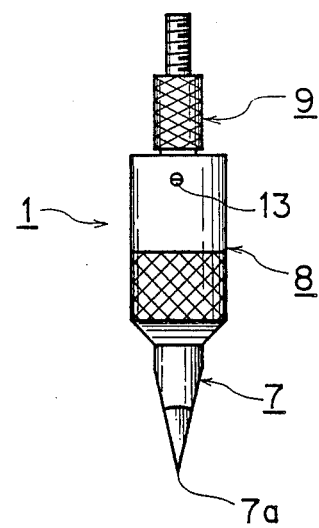
FIG. 2
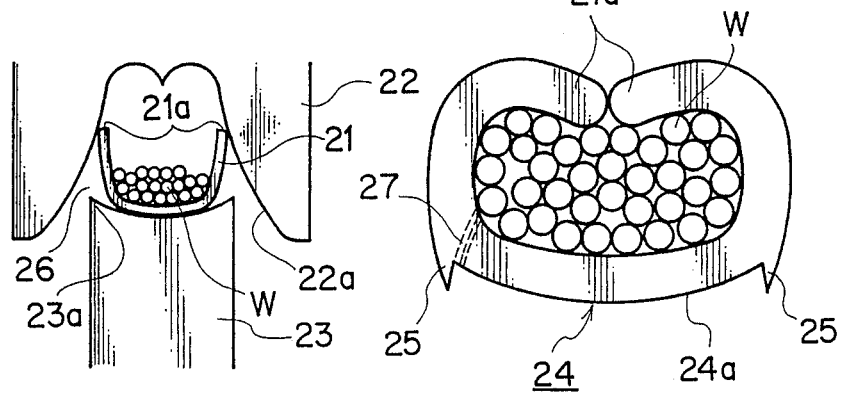
FIG. 5
FIG. 6

METHOD OF MEASURING THE HEIGHT OF BURRS AND A BURR MEASURING HEAD

BACKGROUND OF THE INVENTION

1. Field of the Invention

The present invention relates to a method of measuring the height of burres and a burr height measuring head for carrying out the same and, more particularly, to a method of measuring the height of burres formed in the clamping portion of a crimp-style terminal (hereinafter referred to simply as "terminal") in swaging or crimping the clamping portion of the terminal and a burr height measuring head for carrying out the same.

2. Description of the Prior Art

Generally, a cable is fastened to a terminal by swaging or crimping portion of the terminal as shown in FIG. 7. In fastening a cable to a brass terminal, the bared end W of the cable is placed in the U-shaped clamping portion 21 of the terminal placed on the lower die 23 of a terminal crimping machine, and then the side walls of the U-shaped clamping portion is crimped so that the extremities 21a of the side walls are bent inward to clamp the bared end W of the cable with the U-shaped clamping portion 21 as shown in FIG. 5. In some cases, burres 25 are formed in the crimped clamping portion 24 thus formed as shown in FIG. 6.

Flashes 25 occur in a gap 26 between the mating faces of the upper die 22 and the lower die 23. Therefore, the size of burres 25 increases gradually as the gap 26 between the mating surfaces of the upper die 22 and the lower die 23 increases due to the enlargement of the die opening 22a of the upper die 22 or the abrasion of the mating edges 23a of the lower die 23 when the upper die 22 and the lower die 23 are used on the terminal crimping machine for a long time.

Such a burr 25 reduces the clamping force of the terminal, deteriorates the electrical and fastening characteristics of the crimped clamping portion 24, and also stress 27 is concentrated near the burr 25 as shown in FIG. 6 so that, in the worst case, a crack is formed near the burr 25 and the crimped clamping portion 24 breaks off. Furthermore, the burres 25 interfere with a connector housing in inserting the terminal into the connector housing, making the inserting operation quite dilfficult.

Accordingly, it has been an ordinary practice to control the quality of the crimping process by directly measuring the height of the burr from time to time with a vernier caliper, by indirectly measuring the height by forming an image of the crimped clamping portion by an optical projecting system or by measuring the height by a contour tracer.

However, it is difficult to measure the height directly at a sufficient accuracy with a vernier caliper because the height of the burr is very small. In measuring the height of the burr by an optical projecting system, the terminal fastened to a cable by crimping must be cut off from the cable to form the image of the burr by the optical projecting system, resulting in a time-consuming operation. Although capable of measuring the height of the burr at a high accuracy, the contour tracer is very expensive and hence it is impossible to provide a terminal crimping line with many contour tracers for efficient measurement.

SUMMARY OF THE INVENTION

Accordingly, it is an object of the present invention to provide a method of measuring the height of burres eliminating the foregoing disadvantages of the conventional techniques and capable of measuring the height of burres at a sufficiently high accuracy in a short time.

It is another object of the present invention to provide an inexpensive burr height measuring head for measuring the height of burres, enabling the measurment of the height of burres at a sufficient accuracy in a short time and having a simple construction.

To achieve the object, the present invention provides a method of measuring the height of burres, comprising the operations of placing a measuring head provided with a measuring bit having a knife-edged tip, and attached to a movable measuring member of a displacement measuring device at a position where the knife-edged tip is in parallel contact with the bottom side of a burr, lifting up the measuring head, turning the measuring bit to set the knife-edged tip substantially perpendicularly to the edge of the burr, and placing the burr height measuring head at a position where the knife-edged tip of the measuring bit rests on the edge of the burr. The height of the burr corresponds to the displacement of the burr height measuring head from the former position to the latter.

The present invention provides also a burr height measuring head for measuring the height of burres, comprising a measuring bit having a knife-edged tip, a grip formed integrally with the measuring bit and connected at one end thereof to the movable measuring member of a displacement measuring device, and means for rotatably holding the grip on the movable measuring member of the displacement measuring device.

In measuring the height of a burr, the burr height measuring head is placed at the former position with the knife-edged tip of the measuring bit in parallel contact with the bottom side of the burr, and then the measuring bit is placed at the latter position with the knife-edged tip measuring bit resting on and penpendicularly to the edge of the burr. The displacement of the movable measuring member of the displacement measuring device corresponds to the difference between the former and latter positions corresponding to the height of the burr. The displacement of the movable measuring member representing the height of the burr is indicated on the displacement measuring device.

Thus, the method of measuring the height of burres in accordance with the present invention is capable of measuring the height of a burr formed in the crimped clamping portion of a terminal at a high accuracy in a short time through a simple procedure. Furthermore, the burr height measuring head for measuring the height of burres in accordance with the present invention is simple in construction, and is inexpensive since it comprises only a small number of component parts and is used in combination with a displacement measuring device available in the market. Still further, since the measuring bit is applied directly to a burr in measuring the height of the burr, the terminal fastened to a cable need not be cut off from the cable for burr measurement, which improves the effeciency of burr height measuring work.

BRIEF DESCRIPTION OF THE DRAWINGS

The above and other objects, features and advantages of the present invention will become more apparent from the following description taken in conjunction with the accompanying drawings in which:

FIG. 1 is a front elevational view of a burr height measuring head for measuring the height of burres, embodying the present invention;

FIG. 2 is a side elavational view of the burr height measuring head of FIG. 1;

FIG. 5 is a schematic illustration of assistance in explaining a terminal crimping process;

FIG. 6 is a schematic illustration of an enlarged terminal clamping portion showing its finally clamped state.

DETAILED DESCRIPTION OF THE PREFERRED EMBODIMENT

Figure 3:
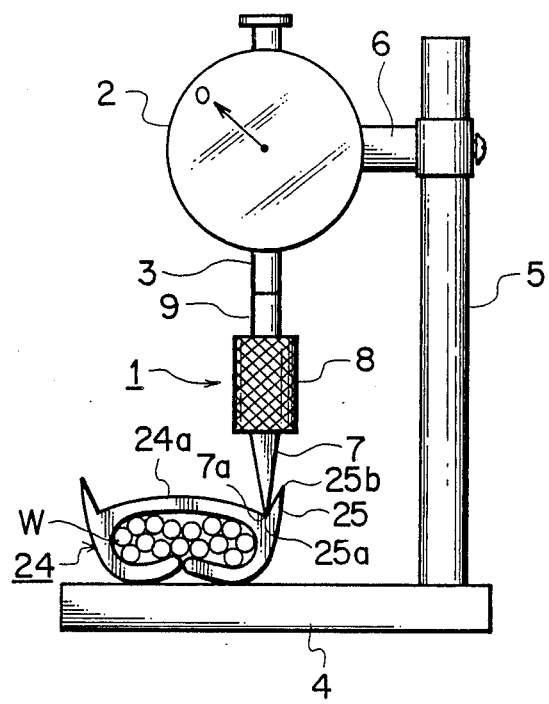
FIGS. 3 and 4 are front elevational views of a burr height measuring apparatus for measuring the height of burres, incorporating the burr height measuring head of FIG. 1, of assistance in explaining steps of a burr height measuring procedure.

As shown in FIG. 3, a burr height measuring head 1 embodying the present invention is used in combination with, for example, a dial gauge 2 available in the market. The burr height measuring head 1 is attached to the extremity of the spindle 3 of the dial gauge 2 instead of an ordinary measuring bit, not shown, for the dial gauge 2. The dial gauge 2 is held on a dial gauge stand consisting of a base plate 4, a pole 5 standing upright on the base plate 4, and an arm 6 slidably formed along the pole 5.

Referring to FIGS. 1 and 2, the burr height measuring head 1 comprises a measuring bit 7 having a knife-edged tip 7a, a grip 8 formed integrally with the measuring bit 7, and a connecting member 9 joined to the extremity of the spindle 3 of the dial gauge 2.

Figure 4:
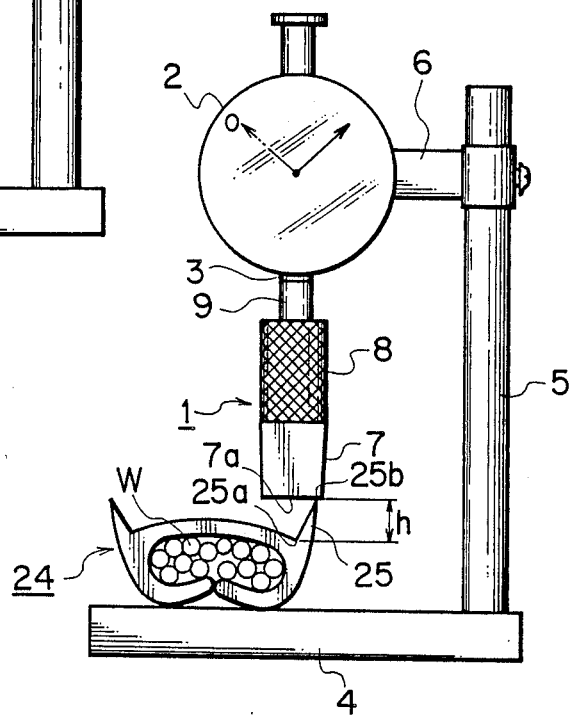
Figure 7:
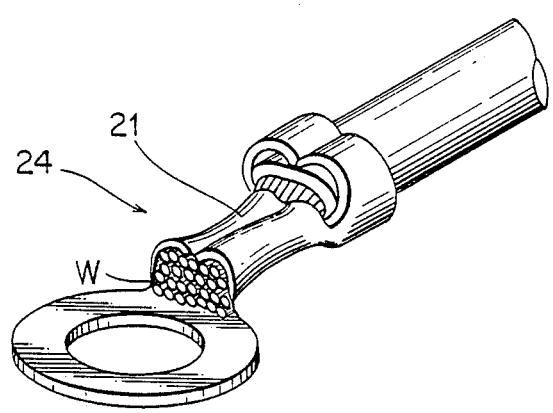
FIG. 7 is a perspective view showing a terminal fastened to a cable by crimping.

The measuring bit 7 is formed of a hard material and the hardness of the tip 7a thereof is on the order of H 60. Practically, the height of a burr 25 formed in the crimped clamping portion 24 of a terminal is a very small value in the range of 0 to 0.6 mm. Therefore, the size, particularly, the width, and the shape of the knife-edged tip 7a, which is brought into contact with the burr 25, must be determined properly so that the knife-edged tip 7a will not touch the bottom wall 24a of the crimped clamping portion 24 when the same is brought into contact with the edge of the burr 25 as shown in FIG. 4. The width of the knife-edged tip 7a, for example, is 1.3 mm.

The measuring bit 7 extends from the frustum-shaped lower end 10 of the grip 8. Small ridges 11 are formed in the circumference of the grip 8 to ensure an easy and firm grip of the same. The grip 8 relative to the spindle 3 of the dial gauge 2 is thus turned by rotating the ridges 11 so as to turn the knife-edged tip 7a relative to the burr 25. An axial bore 12 for rotatably receiving the lower end of the connecting member 9 is formed in the upper end 8b, namely, the end on the side of the dial gauge 2, of the grip 8. Diametrically threaded hole 14 is formed in the grip 8 near the upper end 8b of the same to receive set screws 13 therein.

The connecting member 9 is provided in the middle section thereof with a knurled gripping portion 15, a connecting rod portion 16 formed on one side of the gripping portion 15, and a screw portion 17 formed on the other side of the gripping portion 15 so as to be screwed into a threaded hole formed in the extremity of the spindle 3 of the dial gauge 2. An annular groove 18 having a semi-spherical section is formed in the circumference of the connecting rod portion 16 at a position corresponding to the threaded hole 14 when the connecting rod portion 16 is fitted in the bore 12 of the grip 8, to receive balls 19 therein.

In assembling the burr height measuring head 1, the connecting rod portion 16 of the connecting member 9 is fitted loosely in the bore 12 of the grip 8, and then the set screws 13 are screwed in the threaded hole 14 for abutting the balls 19 into the annular groove 18 so as to hold the balls for free rolling therein. Thus, the connecting member 9 is connected to the grip 8 so that the grip 8 is rotatable relative to the connecting member 9. Then, the screw portion 17 of the connecting member 9 is screwed in the extremity of the spindle 3 of the dial gauge 2 by turning the gripping portion 15 by hand so as to connect the burr height measuring head 1 to the extremity of the spindle 3.

In measuring the height of burr, first the burr height measuring head 1 is combined with the dial gauge 2 in the foregoing manner. Then, the dial gauge is attached to the dial gauge stand and the dial gauge stand is placed beside a terminal crimping machine.

Referring to FIG. 3, the crimped clamping portion 24 of a terminal connected to a cable is placed on the base plate 4 with the bottom wall 24a having burres 25 facing upward. The terminal need not be separated from the cable. The arm 6 of the dial gauge stand is moved vertically along the pole 5 and the crimped clamping portion 24 is moved horizontally to locate the measuring bit 7 of the burr height measuring head 1 so that the knife-edged tip 7a thereof is in parallel contact with the bottom side 25a of the burr 25. In this state, the dial of the dial gauge 2 is adjusted so that the zero scale mark of the scale on the dial coincides with the pointer.

Then, the burr height measuring head 1 is raised slowly and the grip 8 is turned through an angle of 90 relative to the connecting member 9, and then the burr height measuring head 1 is lowered to place the knife-edged tip 7a of the measuring bit 7 on the edge 25b of the burr 25. Consequently, the height h of the burr 25 is indicated on the scale of the dial gauge 2 by the pointer. After the height of the burr 25 has been thus measured, the terminal is removed from the base plate 4, the cable connected to the terminal is returned to the process line, another terminal connected to the next cable is taken out from the terminal crimping machine, and the same burr height measuring operation is repeated.

Although the present invention has been described as applied to measuring the height of burres formed in the crimped clamping portion of a terminal, the present invention is applicable also to measuring burres formed in other machine parts. The displacement measuring device need not be limited to the dial gauge, but any suitable measuring instrument may be used as the displacement measuring device.

As is apparent from the foregoing description, the burr height measuring head according to the present invention comprises a small number of component parts, has a simple construction, is used in combination with a displacement measuring device available in the market, and is capable of readily and quickly measuring the height of burres formed in the crimped clamping portion of a terminal at a satisfactorily high accuracy without disconnecting the crimped clamping portin from the cable.

Although the invention has been described in its preferred form with a certain degree of particularity, many changes and variations are possible therein. It is therefore to be understood that the present invention may be practiced otherwise than specifically described herein without departing from the scope and spirit thereof.

What is claimed isd

1. A method of measuring the height of burr by a measuring head provided with a measuring bit having a knife-edged tip, and attached to the movable measuring member of a displacement measuring device, comprising the steps of;

placing said measuring head in such a manner that said knife-edged tip is in parallel contact with the bottom side of said burr;

reading a scale marked by a pointer of said displacement measuring device;

lifting up said measuring head;

turning said measuring head so that said knife-edged tip extend substantially perpendicularly to the edge of said burr;

placing said measuring head so that said knife-edged tip is in contact with said edge of said burr; and reading again scale marked by said pointer of said displacement measuring device.

2. The method of measuring the height of burr as claimed in claim 1 further comprising a step of adjusting said pointer of said displacement measuring device to coincide with the zero mark thereof after the step of placing said measuring head at the bottom side of said burr.

3. A burr height measuring head for measuring the height of a burr, comprising;

a grip having upper and lower ends, said grip upper end having a longitudinal bore partially passing therethough;

a measuring bit having a knife-edged tip and formed integrally with said grip so as to project from said lower end of said grip;

a holding means for adjustably holding said upper end of said grip to a connecting rod portion of a moveable measuring member of a displacement measuring device, said connecting rod portion being fitted into said longitudinal bore and adjustably held by said holding means; and a rotating means operably connected to said holding means for rotating said measuring bit relative to said connecting rod portion when taking burr height measurements by having said holding means adjustably release said grip upper end from said connecting rod portion.

4. The burr height measuring head as in claim 3, further comprising a connecting means joined to said connecting rod portion for coupling said connecing rod portion to said displacement measuring device.

5. The burr height measuring head as in claim 3, wherein said holding means includes at least one screw partially passing through said upper end of said grip.

6. The burr height measuring head as in claim 3, wherein said rotating means includes a plurality of balls disposed between an inner portion of said grip and said connecting rod portion.

7. The burr height measuring head as in claim 6, wherein said balls are disposed within a groove portion of said connecting rod portion.

* * * * *